(12) United States Patent
Artman (Arad)

(10) Patent No.: US 8,943,422 B2
(45) Date of Patent: *Jan. 27, 2015

(54) SYSTEM AND METHOD FOR A MESSAGING INTERFACE (71) Applicant: AOL Inc., Dulles, VA (US)

(72) Inventor: Ronen Artman (Arad), Hod-Hasharon (IL)

(73) Assignee: AOL Inc., Dulles, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/444,556

(22) Filed: Jul. 28, 2014

(65) Prior Publication Data

US 2014/0337766 A1 Nov. 13, 2014

Related U.S. Application Data (63) Continuation of application No. 11/986,768, filed on Nov. 26, 2007, now Pat. No. 8,793,596.

(51) Int. Cl.
G06F 3/048 (2013.01)
G06F 9/46 (2006.01)
H04L 12/58 (2006.01)
G06F 3/0481 (2013.01)

(52) U.S. Cl.
CPC ............ H04L 51/046 (2013.01); G06F 3/0481 (2013.01); G06F 33/04842 (2013.01)
USPC .......................................... 715/758; 715/759

(58) Field of Classification Search
CPC .................................. G06F 3/048; G06F 9/46
USPC ............................................... 715/758, 759
See application file for complete search history.

(56) References Cited

U.S. PATENT DOCUMENTS

| | | |
|---|---|---|
| 6,212,548 B1 | 4/2001 | DeSimone et al. |
| 6,539,421 B1 | 3/2003 | Appelman et al. |
| 6,557,027 B1 | 4/2003 | Cragun |
| 6,785,708 B1 | 8/2004 | Busey et al. |
| 6,785,866 B1 | 8/2004 | Lewis et al. |
| 6,907,447 B1 | 6/2005 | Cooperman et al. |
| 7,185,285 B2 | 2/2007 | Van Dok et al. |
| 7,263,526 B1 | 8/2007 | Busey et al. |
| 7,278,108 B2 | 10/2007 | Duarte et al. |
| 8,020,105 B1 | 9/2011 | Lemay et al. |
| 2003/0035011 A1 | 2/2003 | Lee et al. |
| 2004/0078441 A1 | 4/2004 | Malik et al. |
| 2004/0228531 A1* | 11/2004 | Fernandez et al. ............ 382/187 |

(Continued)

OTHER PUBLICATIONS

Windows Live Messenger, Internet page.

(Continued)

Primary Examiner — Andrea Leggett
(74) Attorney, Agent, or Firm — Finnegan, Henderson, Farabow, Garrett & Dunner, LLP (57) ABSTRACT Computer-implemented systems and methods for a simplified messaging interface are provided for allowing users to initiate and engage in messaging conversations. In various embodiments, the systems and methods reduce the overhead involved in initiating and/or engaging in messaging conversations. In some embodiments, the messaging interface allows users to initiate and/or engage in conversations without having to open a separate standard messaging window for every conversation. In some embodiments, the simplified messaging interface may be used in conjunction with a standard messaging interface.

18 Claims, 10 Drawing Sheets

(56) References Cited

U.S. PATENT DOCUMENTS

| | | |
|---|---|---|
| 2005/0027839 A1 | 2/2005 | Day et al. |
| 2005/0055405 A1* | 3/2005 | Kaminsky et al. ............ 709/206 |
| 2005/0223069 A1* | 10/2005 | Cooperman et al. .......... 709/206 |
| 2006/0026288 A1 | 2/2006 | Acharya et al. |
| 2008/0155041 A1* | 6/2008 | Patel ............................ 709/206 |
| 2008/0201437 A1 | 8/2008 | Ludwig et al. |
| 2008/0228894 A1* | 9/2008 | Chen et al. .................... 709/207 |
| 2009/0075681 A1 | 3/2009 | Jager |

OTHER PUBLICATIONS

Yahoo! Messenger (8.1), Internet page, Copyright 2008 Yahoo! Inc.

* cited by examiner

SYSTEM AND METHOD FOR A MESSAGING INTERFACE

CROSS REFERENCE TO RELATED APPLICATION(S)

This application is a continuation of U.S. patent application Ser. No. 11/986,768, filed on Nov. 26, 2007 (now allowed), the disclosure of which is expressly incorporated herein by reference to its entirety.

LIMITED COPYRIGHT AUTHORIZATION

A portion of the disclosure of this patent document includes material which is subject to copyright protection. The copyright owner has no objection to the facsimile reproduction by anyone of the patent document or the patent disclosure as it appears in the Patent and Trademark Office patent file or records, but otherwise reserves all copyrights whatsoever.

BACKGROUND OF THE DISCLOSURE

1. Field of the Disclosure

The present disclosure relates to the field of electronic systems for providing instant messaging. More specifically, the present disclosure relates to computer-implemented systems and methods for an instant messaging interface.

2. Description of the Related Art

Instant messaging ("IM") is a popular form of electronic communication allowing users to communicate with each other in real-time. Instant messaging is most commonly done over a computer network, and can be implemented on mobile devices and other electronic devices. Each user is associated with a unique user identification ("ID"). Most IM client software applications allow a user to create a messaging contact list ("buddy list") which includes the ID's of the contacts that user commonly communicates with using IM.

SUMMARY OF THE DISCLOSURE

Using a standard IM interface, an IM session may begin with a sending user initiating a conversation by selecting the ID of a recipient user the sending user wishes to communicate with, causing a messaging window associated with the recipient user ("standard IM window") to open. The sending user then composes an instant message into the standard IM window and sends the message to the recipient user. The IM client software causes the message to be transmitted over a network to the IM client software running on the recipient user's system. The recipient user is notified of the message and may respond to it in a similar manner. IM client software typically allows a user to simultaneously engage in multiple conversations with multiple users.

Using a standard IM interface, conversations often start with a sending user sending a message to find out if the recipient user is available to receive a message. For example, sending users may send messages such as "yt?" (you there?), "ayt?" (are you there?), abbreviations which are commonly used in IM. Using a standard IM interface, a standard IM window remains open when the sending user waits to get the response. In many cases, a response may never be received and the conversation is abandoned. In such a case, both the sending and receiving users may have to actively close the standard IM windows that were opened but were never used for interaction. Thus one benefit of one embodiment of a simplified IM interface is that the overhead associated with users initiating conversations and/or having to actively open and close standard IM windows in order to initiate conversations is reduced.

In addition, cluttering of a device screen with multiple application windows can be burdensome. Computer users, for example, typically have multiple windows open from various software applications, each window taking up limited space of a computer desktop. When too many windows are open at the same time, it can become difficult to manage the desktop efficiently. A problem with current IM technology is that a separate, standard messaging window is opened for each conversation. Thus, one important benefit of one embodiment of the simplified IM interface disclosed in the present application is that it allows users to engage in an IM conversation without having to open a separate standard IM messaging window for each conversation.

One embodiment of the present disclosure is a computer-implemented method of providing a simplified instant messaging interface, wherein a message-entry field is provided associated with a selected message recipient. The message-entry field may be integrated with a messaging contact list. The method further includes receiving a message into the message-entry field and sending the message to the selected message recipient.

Another embodiment is a system for providing a simplified instant messaging interface, comprising an instant messaging client module configured to allow a user to communicate over a network with other instant messaging clients. The system further comprises a message-entry module in communication with the instant messaging client module, wherein the message-entry module comprises a message-entry field associated with a selected message recipient which receives a message and is integrated with a messaging contact list. The message-entry module sends the message to the selected message recipient.

A further embodiment is a computer-implemented method for executing a computer application in a graphical user interface windowing environment. The method comprises displaying a message-entry field associated with a selected message recipient and integrated with a messaging contact list within a graphical window. The method further comprises receiving a message into the message-entry field and sending the message to the selected message recipient.

Yet another embodiment is a computer-implemented method of providing a simplified instant messaging interface. The method comprises providing a message-entry field associated with a messaging console, receiving a message into the message-entry field and sending the message to a selected message recipient.

For purposes of summarizing the invention, certain aspects, advantages and novel features have been described herein. Of course, it is to be understood that not necessarily all such aspects, advantages or features will be embodied in any particular embodiment. Moreover, it is to be understood that not necessarily all such advantages or benefits may be achieved in accordance with any particular embodiment of the invention. Thus, for example, those skilled in the art will recognize that the invention may be embodied or carried out in a manner that achieves one advantage or group of advantages as taught herein without necessarily achieving other advantages or benefits as may be taught or suggested herein.

BRIEF DESCRIPTION OF THE DRAWINGS

These and other features will now be described with reference to the drawings summarized below. These drawings and the associated description are provided to illustrate a preferred embodiment of the invention, and not to limit the scope of the invention.

DETAILED DESCRIPTION OF PREFERRED EMBODIMENTS

Systems and methods which represent various embodiments and example applications of the present disclosure will now be described with reference to the drawings. For purposes of illustration, some embodiments will be described in the context of IM systems and methods implemented on a computer. However, the present invention is not limited by the type of environment in which the systems and methods are used; the systems and methods may be used in other environments, such as, for example, cell phones, other mobile devices and so forth. Moreover, the specific implementations described herein are set forth in order to illustrate, and not to limit, the invention.

I. Overview

For purposes of providing an overview of some embodiments, certain aspects, advantages, benefits, and novel features of the invention are described herein. It is to be understood that not necessarily all such advantages or benefits may be achieved in accordance with any particular embodiment of the invention. Thus, for example, those skilled in the art will recognize that the invention may be embodied or carried out in a manner that achieves one advantage or group of advantages as taught herein without necessarily achieving other advantages or benefits as may be taught or suggested herein.

In accordance with the present disclosure, a simplified IM interface is provided. In one embodiment, for example, users are able to initiate, respond to, and generally exchange instant messages using the simplified IM interface. One benefit of one embodiment of the simplified IM interface is that it allows users to initiate and engage in IM conversations without opening a standard IM messaging window.

Figure 1:
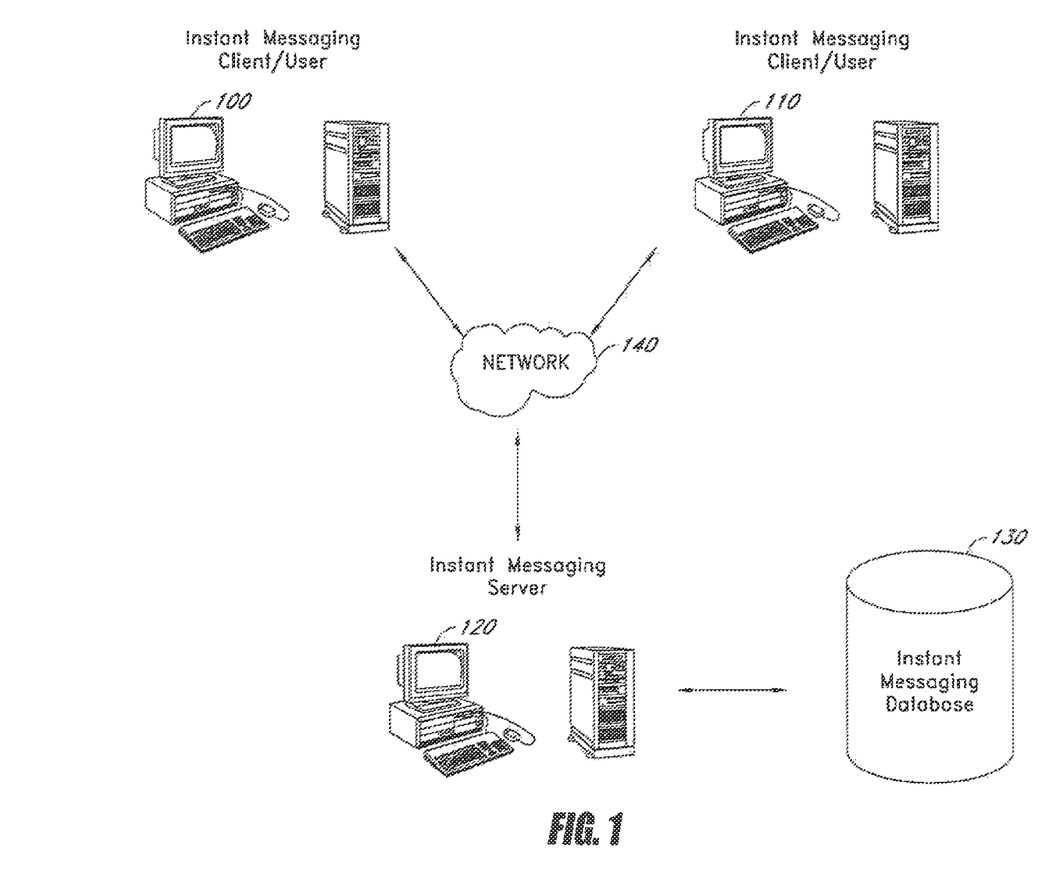
FIG. 1 illustrates a high-level diagram of one embodiment of a network topology over which IM users communicate.

In one embodiment, the simplified IM interface can be used in a system similar to the one illustrated in FIG. 1, which illustrates a high-level diagram of one embodiment of a network topology over which IM users communicate. In one embodiment, an IM client system 100 communicates via a network 140 to another IM client system 110. The IM client systems 100, 110 communicates with an IM server system 120 which communicates with an IM database 130. There may be any number of IM client 100, 110 and server 120 systems. In the illustrated embodiment, the IM client 100, 110 and server 120 systems are computer systems. In other embodiments, the IM client 100, 110 and server 120 systems may be other types of devices, such as, for example, mobile devices. In some embodiments, the IM client 100, 110 and server 120 systems may be any combination of different types of devices. For example, in one embodiment, some of the client systems 100, 110 may be computer systems, some may be mobile devices, and the server system 120 system may be a computer system.

In some embodiments, IM server system 120 maintains the IM database 130 which includes the IM users authorized to communicate over the IM network. The IM server system 120 may include other information, including, for example, personal user information, buddy lists, e-mail addresses of users. In some embodiments, the IM server system 120 receives messages from IM client systems 100, 110 addressed to a desired message recipient, and sends the messages to the IM client systems 100, 110. The illustrated example is just one embodiment of a topology in which an IM system may be implemented. In some embodiments, for example, the IM server system 120 and IM database 130 may not be included in the network topology and IM client systems 100, 110 communicate directly without the intervention of the IM server system 120.

II. Embodiment of a Standard IM Chat Session

Figure 2:
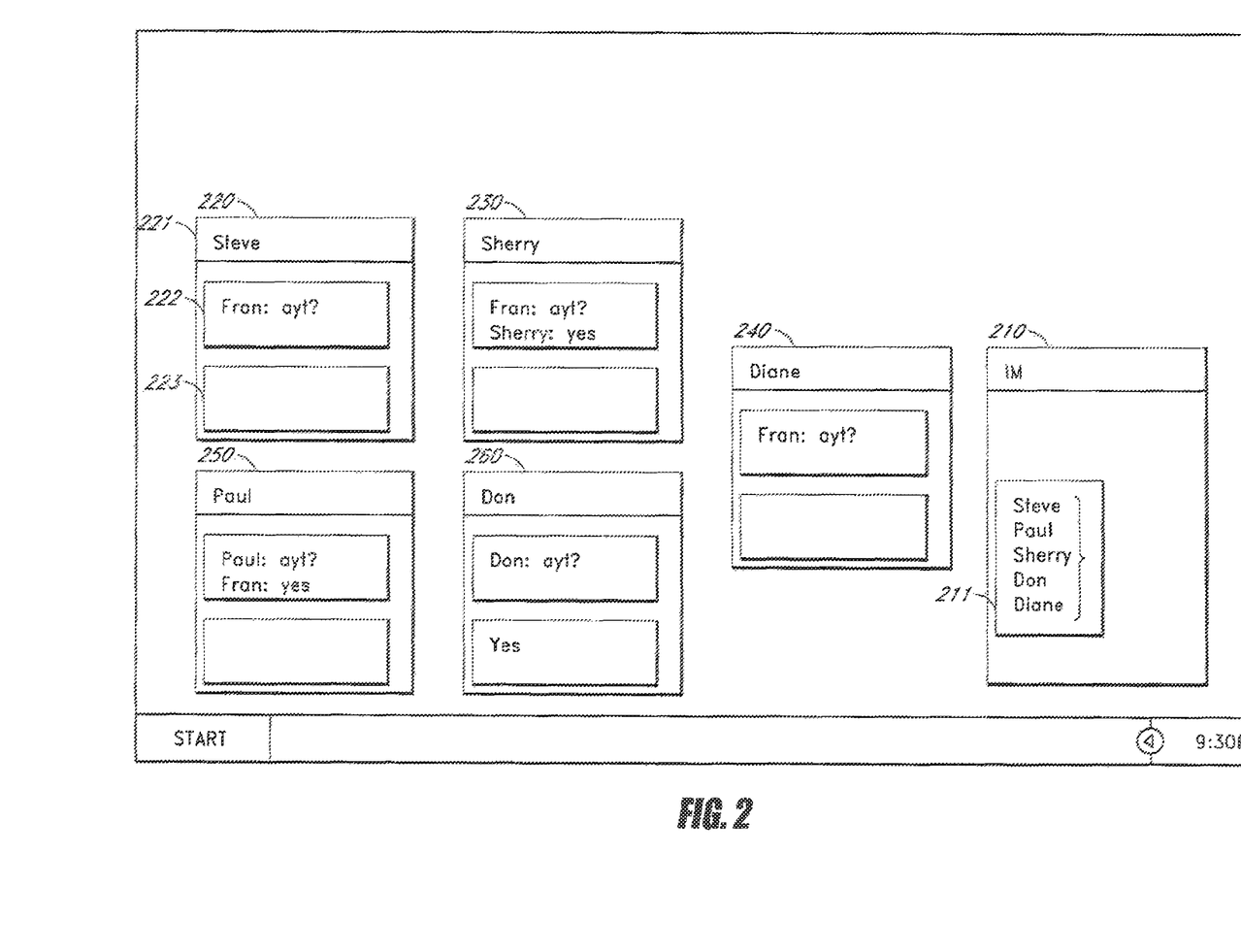
FIG. 2 illustrates an example of a screen display of a standard IM chat session.

FIG. 2 illustrates one embodiment of a screen display of a user who is using a standard IM interface. In the illustrated embodiment, the screen display 200, a computer desktop in this embodiment, includes a standard IM interface which includes a plurality of standard IM messaging windows 220, 230, 240, 250, 260 and a messaging console 210. In some embodiments, the messaging console 210 includes a login function (not shown) which allows the user to log-in to the user's account. The messaging console may also include a number of possible features which are well known to those of skill in the art and are not necessarily shown in the illustrated embodiment. For example, the console may allow a user to change his or her on-line status (for example, from "on-line" to "away") to indicate to other users whether or not that user is available to receive messages.

In the illustrated embodiment, the messaging console 210 includes a messaging contact, or "buddy" list 211, which may include a number of icons or regions 212 corresponding to the contacts that user may frequently communicate with. In some embodiments, the user may select a messaging contact with which they wish to communicate (for example, "Steve") by selecting the associated icon or region such as, for example, by clicking or double-clicking. The IM interface will then, in some embodiments, open a messaging window 220 associated with that contact. In some embodiments, the messaging window 220 includes a conversation transcript display area 222 which displays a transcript of the conversation between the user and the contact. In some embodiments, the messaging window further includes a message entry field 223 into which the sending user can type a message. The user then indicates they want to send the message. For example, in some embodiments, the user may type "Enter" on the keyboard, or may click on a "Send" button (not shown) associated with the message entry field 223 to send the message. As illustrated, in some embodiments, a user who engages in multiple conversations simultaneously in a standard IM interface have many standard IM windows 220, 230, 240, 250, 260 open at any given time.

III. Embodiment of a Sample IM Conversation Using a Simplified IM Interface

Figure 3A:
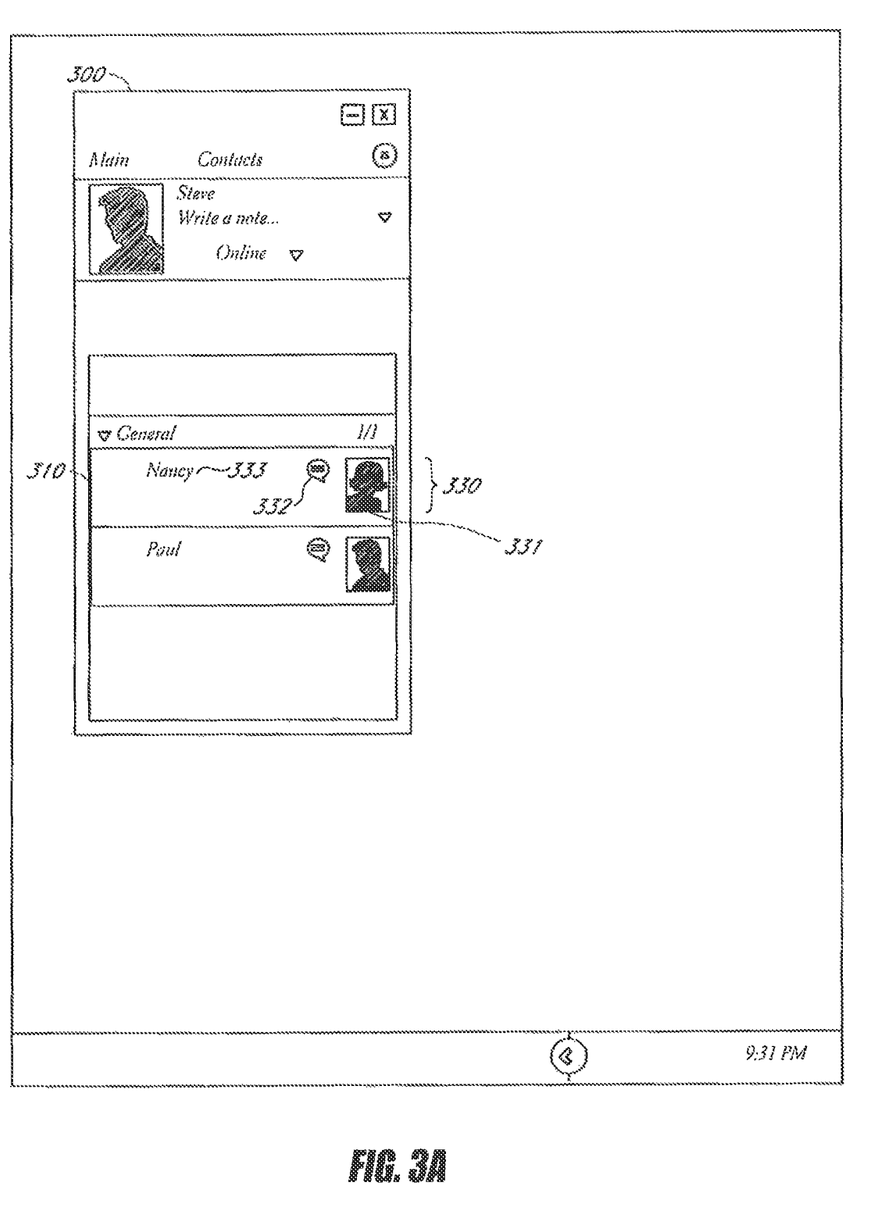
FIGS. 3A-E sequentially illustrate one embodiment of an IM conversation using one embodiment of a simplified IM interface.
Figure 3B:
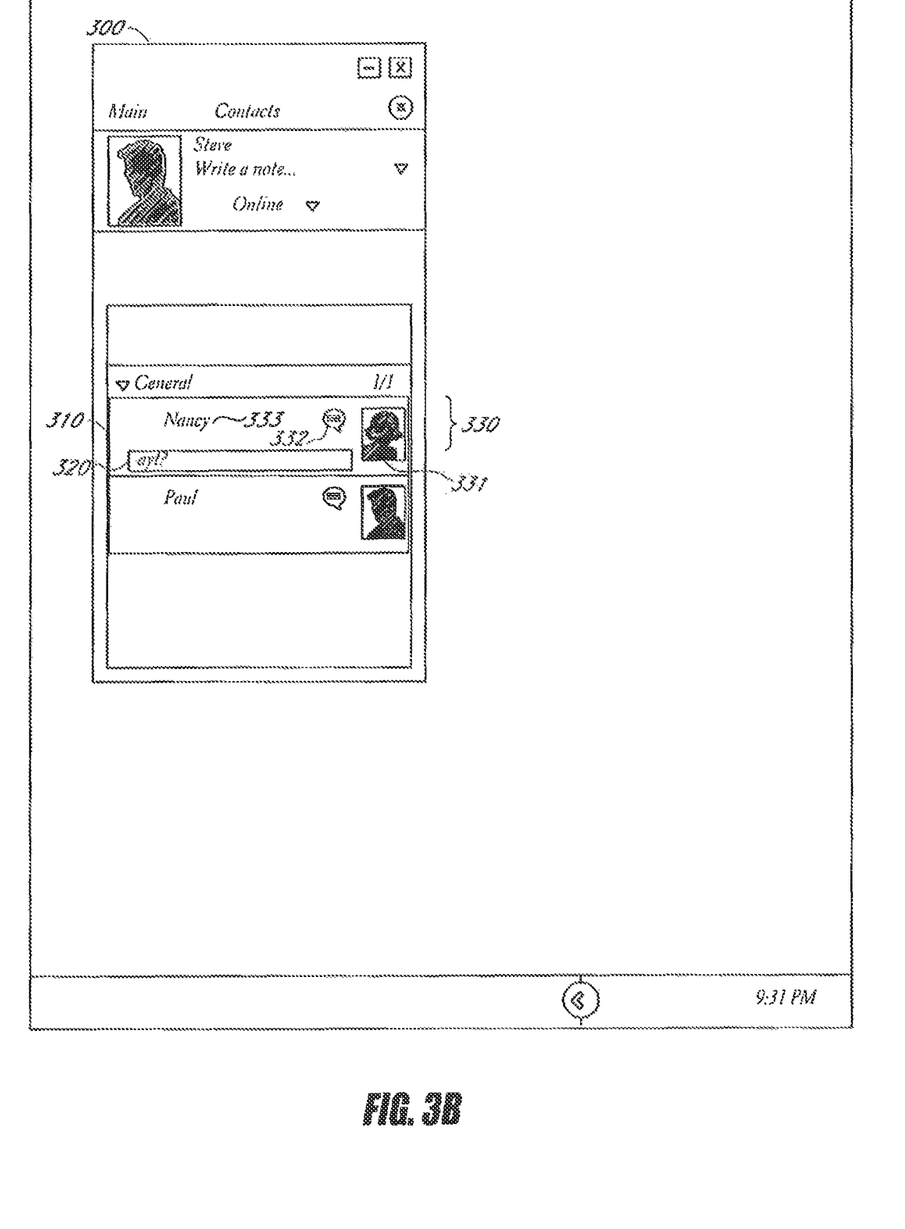

FIGS. 3A-E sequentially illustrate one embodiment of an IM conversation using one embodiment of a simplified IM interface. FIG. 3A illustrates a messaging console 300 for a user, Steve, who has two contacts, Nancy and Paul, in his messaging contact list 310. At some point, Steve decides to send a message to Nancy using the simplified IM interface to determine whether or not Nancy is available to have an IM conversation. As illustrated by FIG. 3B, Steve activates the simplified IM interface by opening a simplified message entry field 320 which is associated with and/or integrated with the messaging contact list 310 and does not, in this embodiment, open a standard messaging window. In various embodiments, for example, Steve may activate the simplified message entry field 320 by hovering over, clicking-on or highlighting the region 330 associated with Nancy or a portion thereof 331, 332, 333 in the messaging contact list 310. As illustrated, Steve types "ayt?", short for "Are you there?" into the simplified message entry field 320 and sends the message to Nancy, for example, in some embodiments, by pressing the "Enter" key on the keyboard. Those of skill in the art will appreciate that region 330 may be configured in any number of ways in order to allow for the activation of the simplified IM interface. For example, in some embodiments, there may be only one portion 331, 332, 333 that allows for the activation of the simplified IM interface. Alternatively, in other embodiments, there may be more or different types of portions 331, 332, 333 that allow for activation of the simplified IM interface.

Figure 3C:
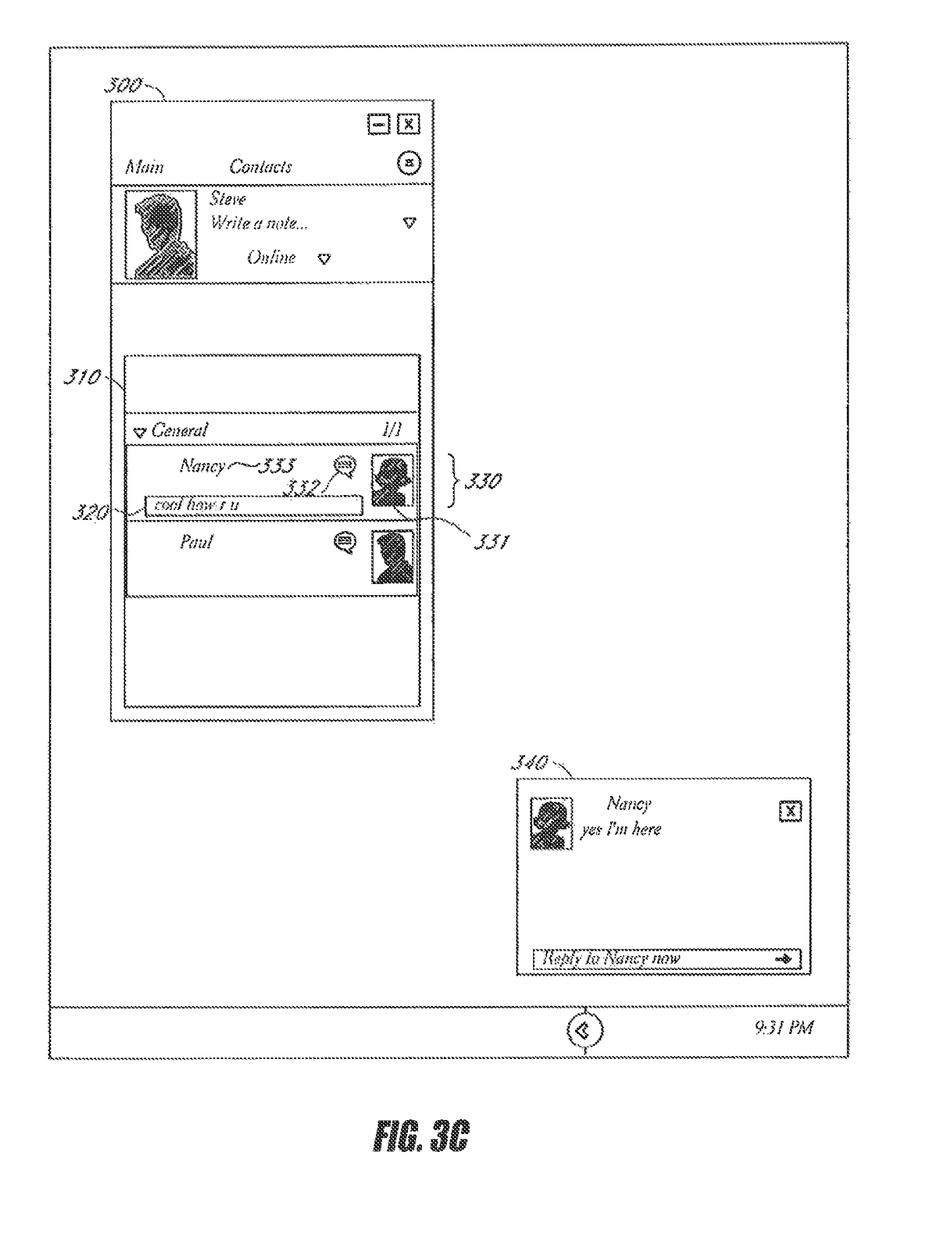

As illustrated in FIG. 3C, in this embodiment, Nancy replies to Steve's message. Her response, "yes I'm here" is indicated in the response notification window 340. Steve then decides to continue the conversation using the simplified IM interface in a manner similar to that described in FIG. 3B. This time Steve types "cool how r u", shorthand for "cool, how are you?," into the simplified message entry field 320 and sends the message.

Figure 3D:
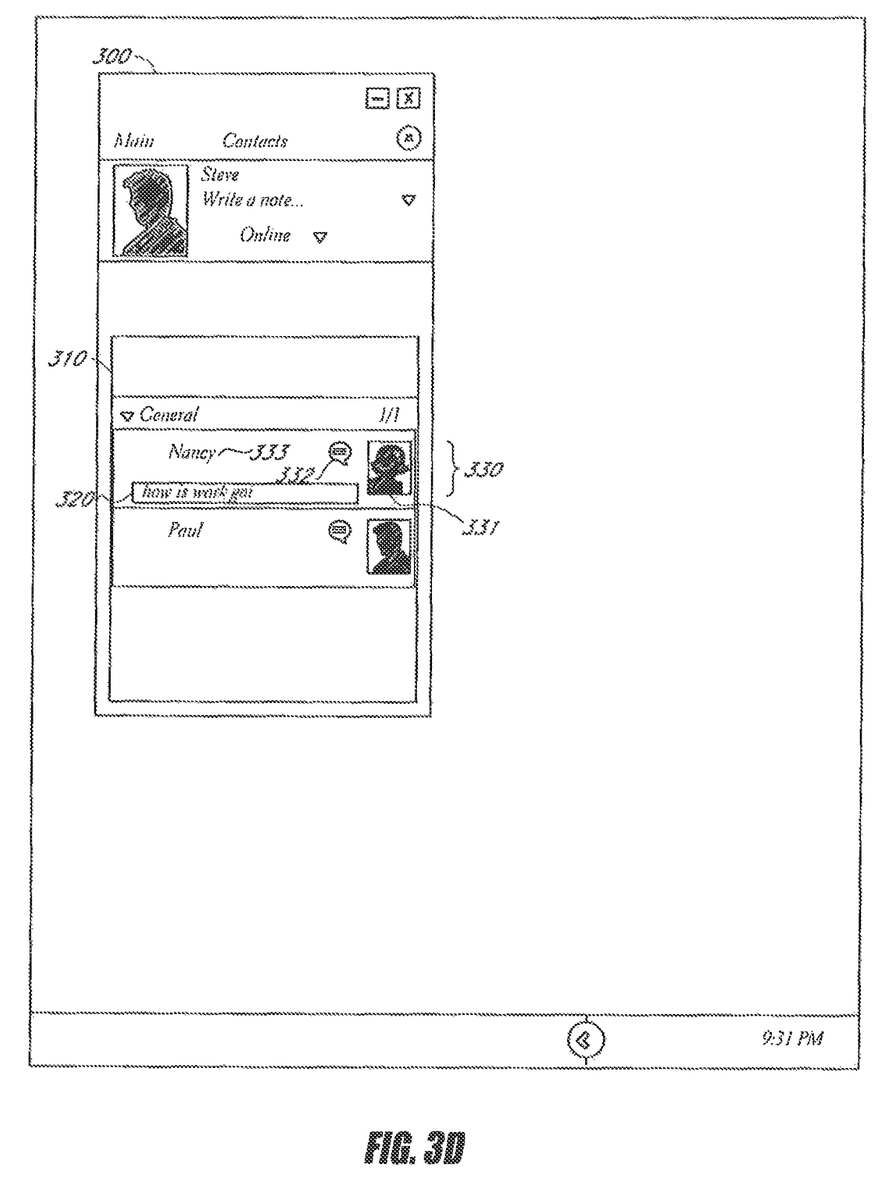
Figure 3E:
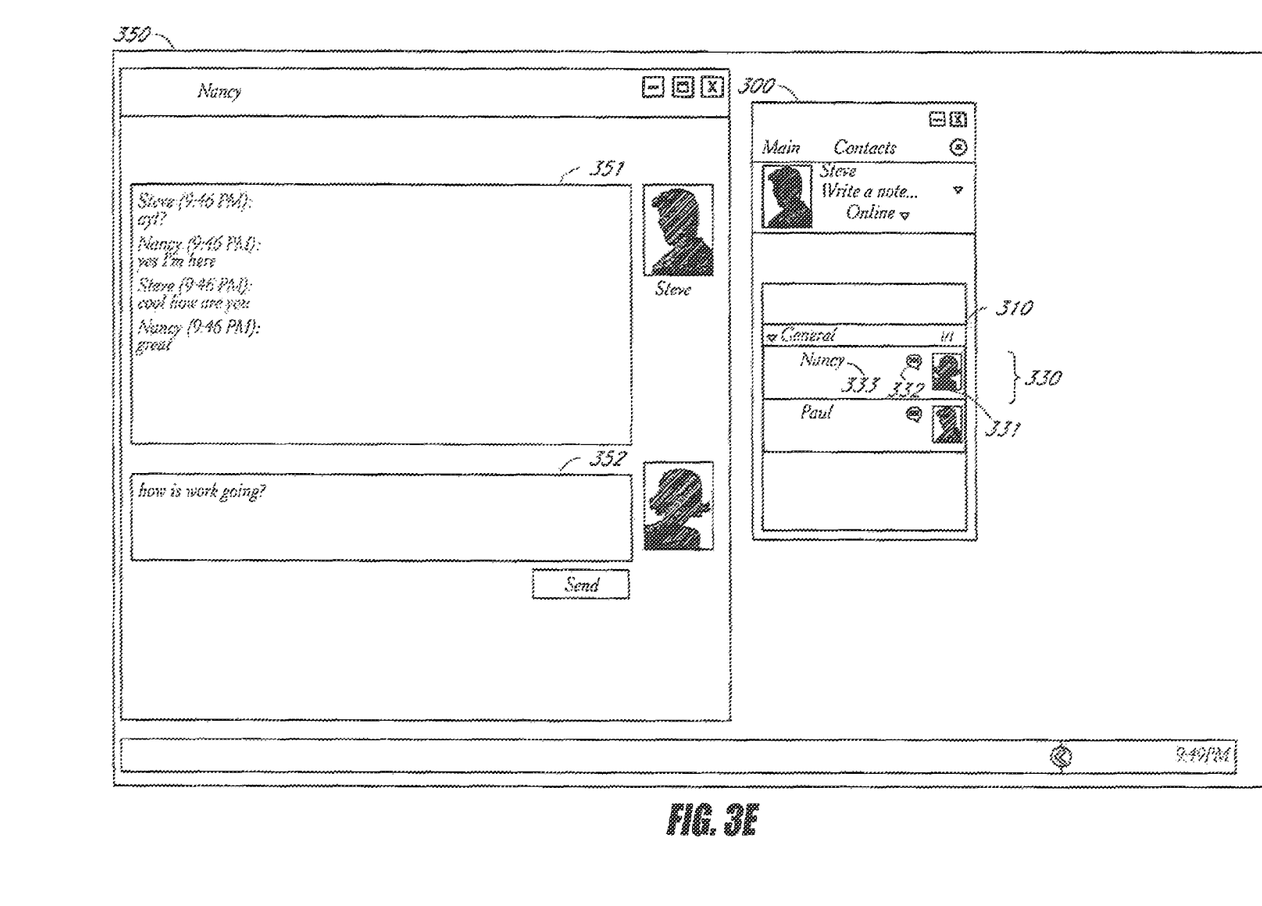

As depicted by FIG. 3D, at a later point in the conversation, Steve begins to send another note to Nancy, "how is work goi," into the simplified message entry field 320 using the simplified IM interface. As illustrated by FIG. 3E, in this embodiment, a standard messaging window 350 opens once a threshold message size is reached in the simplified message entry field 320. In the illustrated embodiment, the threshold message size is 16. Once Steve types character number 16 (including spaces) into the message entry field 320, a standard messaging window 350 opens, displaying a transcript of their conversation to that point in transcript display area 351. Steve's current message is also displayed in standard message entry field 352.

FIGS. 3A-E illustrate one example of a conversation using the simplified IM interface. Many variations of the conversation are possible utilizing the simplified IM interface. For example, in another conversation, the sending user may send two messages using the simplified IM interface before receiving a response from the desired message recipient, or may never in fact receive a response. Moreover, the simplified IM interface can, in some embodiments, be used in combination with the standard IM interface. For example, the user may decide to send the initial message using the simplified IM interface and respond to the reply from the message recipient using the standard IM interface. Alternatively, for example, the user could decide to hold the entire conversation in the simplified IM interface, or entirely in the standard IM interface. The user may go back and forth between using the simplified IM interface and the standard IM interface during the same conversation. In other embodiments, the simplified IM interface may be activated for certain contacts in the user's contact list but not others. For example, Steve may choose to activate the simplified IM interface for Nancy, but not for Paul, or vice versa.

Moreover, in other embodiments, the simplified message entry field 320 may be activated by other mechanisms, including, for example, by voice activation, or by typing a key or a combination of keys. In some embodiments, the simplified message entry field 320 may appear and disappear in different ways. For example, in the illustrated embodiment, the message entry field 320 appears after activated (for example, by a click) and disappears once the message is sent. In other embodiments, the simplified message entry field 320 may remain after the message is sent and may appear in the messaging contact list 310 without separate activation.

Further, in other embodiments the simplified message entry field 320 may appear in different locations. For example, in some embodiments, the simplified message entry field 320 may be located within the messaging contact list 310. In other embodiments, the message entry field 320 may be located within the messaging console 300 but not within the messaging contact list 310. In various embodiments, portions of the simplified message entry field 320 may overlap with portions of the messaging contact list 310 and/or messaging console 300. In further embodiments, the simplified message entry field 320 may be integrated with the response notification window 340 in addition to or instead of with the messaging contact list 310. The simplified message entry field 320 may appear in different locations on the desktop. For example, in some embodiments, the simplified message entry field 320 may appear adjacent to, rather than on or within, the messaging console 300.

In other embodiments, the message entry field 320 may include various additional features. For example, the message entry field 320 may include icons associated with the recipient contact, or any other type of icon. For example, the message entry field may include the user's on-line status indicator or name. In other embodiments, the message entry field 320 may include a conversation transcript or a partial conversation transcript.

In yet other embodiments, the simplified IM interface may be limited to simplifying conversation initiation. For example, in some embodiments, once the first initiating message (for example, "ayt?") using the simplified IM interface is answered, a standard IM window 350 may opened for both the sending and responding users.

For the sake of simplicity, FIG. 3 illustrates one example of a conversation using the simplified IM interface from the perspective of the sending IM client. However, the simplified IM interface may be used by the responding (message recipient) IM client as well in a similar fashion.

IV. Embodiment of a Simplified IM Implemented in a Computing System

Figure 4:
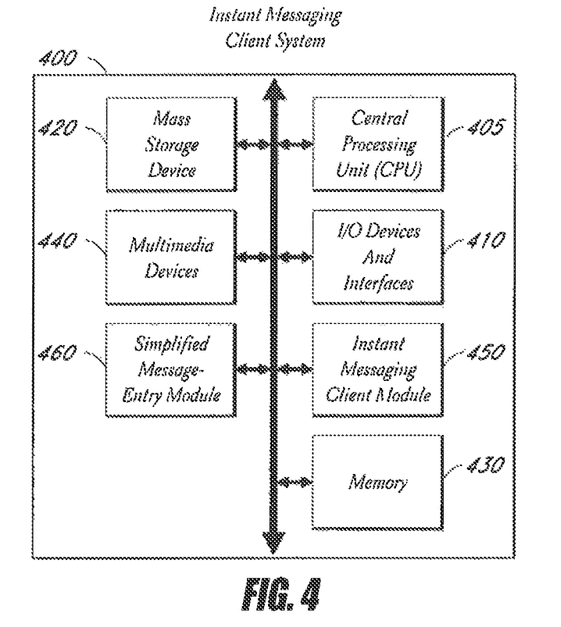
FIG. 4 illustrates a high-level diagram of one embodiment of a computing system in which an IM client may be implemented.

FIG. 4 illustrates a high-level diagram of one embodiment of a computing system 400 in which an IM client system 400 may be implemented. The computing system 400 includes, for example, a personal computer that is IBM, Macintosh, or Linux/Unix compatible. In one embodiment, the computing system 400 comprises a server, personal computer (PC), a laptop computer, a cell phone, a personal digital assistant, a kiosk, Blackberry® device, or an audio player, for example. In other embodiments, the computing system 400 system is another type of portable computing device, a computer workstation, a local area network of individual computers, an interactive wireless communications device, a handheld computer, an embedded computing device, or the like. In one embodiment, the exemplary computing system 400 includes a central processing unit ("CPU") 405, which may include a conventional microprocessor. The computing system 400 further includes a memory 430, such as random access memory ("RAM") for temporary storage of information and a read only memory ("ROM") for permanent storage of information, and a mass storage device 420, such as a hard drive, diskette, or optical media storage device. Typically, the modules of the computing system 400 are connected to the computer using a standards based bus system. In different embodiments, the standards based bus system could be Peripheral Component Interconnect ("PCI"), Microchannel, SCSI, Industrial Standard Architecture ("ISA") and Extended ISA ("EISA") architectures, for example.

The computing system 400 is generally controlled and coordinated by operating system software, such as Windows 95, Windows 98, Windows NT, Windows 2000, Windows XP, Windows Vista, Linux, SunOS, Solaris, or other compatible operating systems. In Macintosh systems, the operating system may be any available operating system, such as MAC OS X. In other embodiments, the computing system 400 may be controlled by a proprietary operating system. Conventional operating systems control and schedule computer processes for execution, perform memory management, provide file system, networking, I/O services, and provide a user interface, such as a graphical user interface ("GUI"), among other things.

The exemplary computing system 400 includes one or more commonly available input/output (I/O) devices and interfaces 410, such as a keyboard, mouse, touchpad, and printer. In one embodiment, the I/O devices and interfaces 410 include one or more display device, such as a monitor, that allows the visual presentation of data to a user. More particularly, a display device provides for the presentation of GUIs, application software data, and multimedia presentations, for example. The computing system 400 may also include one or more multimedia devices 440, such as speakers, video cards, graphics accelerators, and microphones, for example.

In the embodiment of FIG. 4, the I/O devices and interfaces 410 provide a communication interface to various external devices. In one embodiment of FIG. 4, the computing system 400 is electronically coupled to a network. The network 140 communicates with various computing devices and/or other electronic devices via wired or wireless communication links.

In the embodiment of FIG. 4, the computing system 400 also includes an IM client module 450 and a simplified message-entry module 460 that may be executed by the CPU 405. The IM client module 450 is configured to allow a user to communicate over network 140 with other IM clients. The simplified message-entry module 460 is in communication with the IM client module. These modules implement the processes and features described in greater detail above with respect to FIG. 3, and described below with FIGS. 5 and 6. These modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. In other embodiments, IM client module 450 and the simplified message entry module 460 may be implemented as one module.

V. Embodiments of the Method of Operation of a Simplified IM Interface

Figure 5:
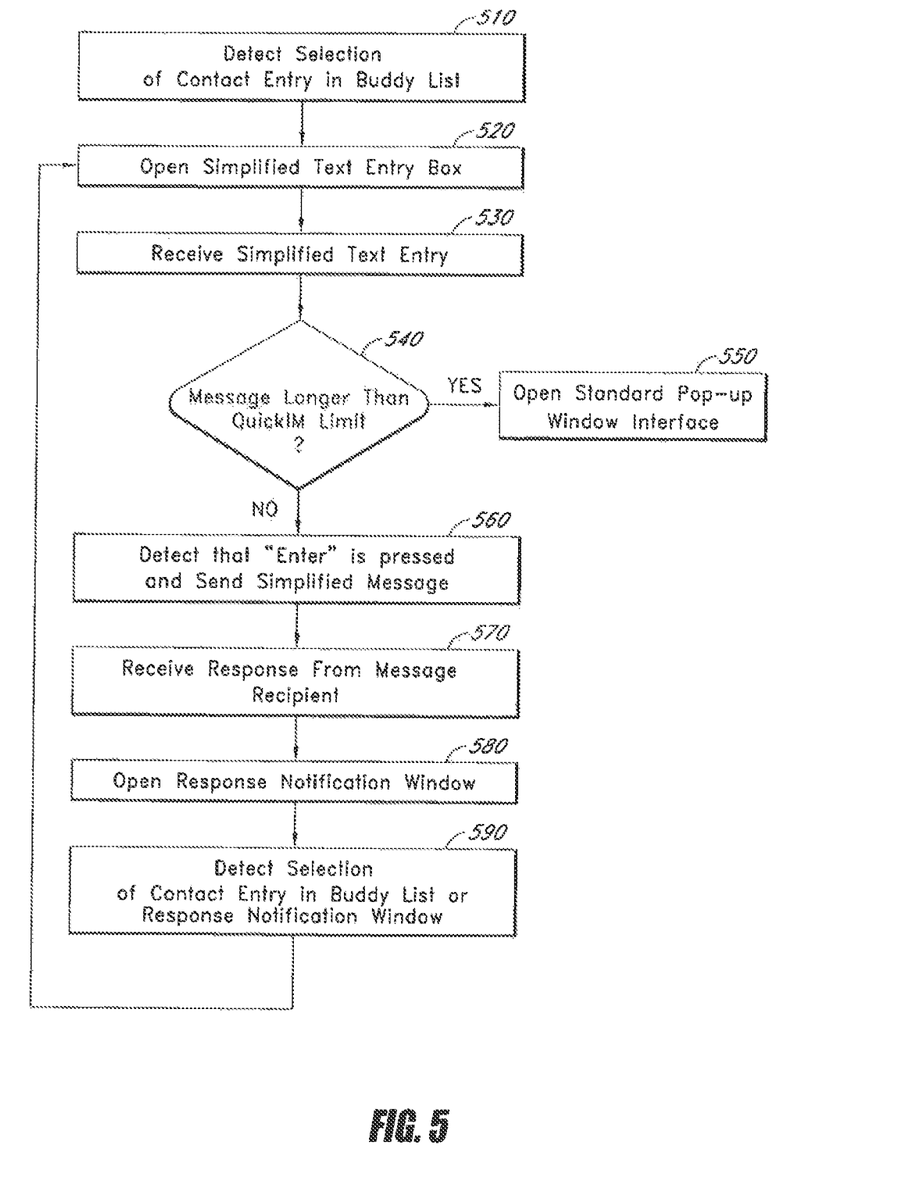
FIG. 5 is one embodiment of a high-level flow chart illustrating one embodiment of a simplified IM interface, viewed from the perspective of the IM client software.

FIG. 5 is a high-level flow chart illustrating one embodiment of the simplified IM interface, viewed from the perspective of the IM client software of the sender. In one embodiment, the IM client detects at state 510 when a user selects a desired message recipient from the messaging contact list by, for example, hovering the cursor over, clicking on or high-lighting the identifier associated with the contact in the contact list. The IM client then activates a simplified message-entry field at state 520 which, in some embodiments, is integrated with the messaging contact list as described above with respect to FIG. 3. The IM client then receives a message into the simplified message-entry field from the user at state 530.

As indicated by decision state 5 40, in some embodiments, a standard messaging window interface will open if the user types a message with more characters than a threshold message size associated with the simplified message-entry field. In some embodiments, the threshold message size is significantly less than the amount displayed in a standard messaging window. For example, the threshold message size may in other embodiments be less than 20 characters, between 20 characters and 100 characters, or greater than 100 characters. In some embodiments, the threshold message size is based on the language of communication. For example the threshold message size may be different in German than in Russian. In some embodiments, the threshold message size may be decided based on an evaluation of usage. For example, if a particular class or category of users is, based on an evaluation of IM usage by that class or category, determined to generally initiate conversations using 30 characters or less, the threshold size for that class or category of users may be set to 30 characters. In some embodiments, the threshold message size is based on the user's display, font size, display size and so forth. In various embodiments, the threshold message size can be 16, 20 or 100 characters. These particular embodiments are presented by way of example only.

If the threshold message size is not reached, the IM client will then detect when or receive an indication that the user has decided to send the message at state 560, and will subsequently transmit the message to the message recipient. For example, the user may press the "Enter" key to indicate that the user wants to send the message. Typically, the conversation will continue by the IM client receiving a response from the message recipient at state 570 and indicating that the response was received by, for example, opening a response notification window which may be a standard IM window or simplified IM field at state 580. The original sender may then want to reply to the response using the simplified IM interface. The IM client will detect user selection of the message recipient at state 590 in a manner similar to that of state 510. When replying to the response, the simplified message entry field may be integrated with the messaging contact list or, alternatively, in some embodiments, with the response notification window.

Figure 6:
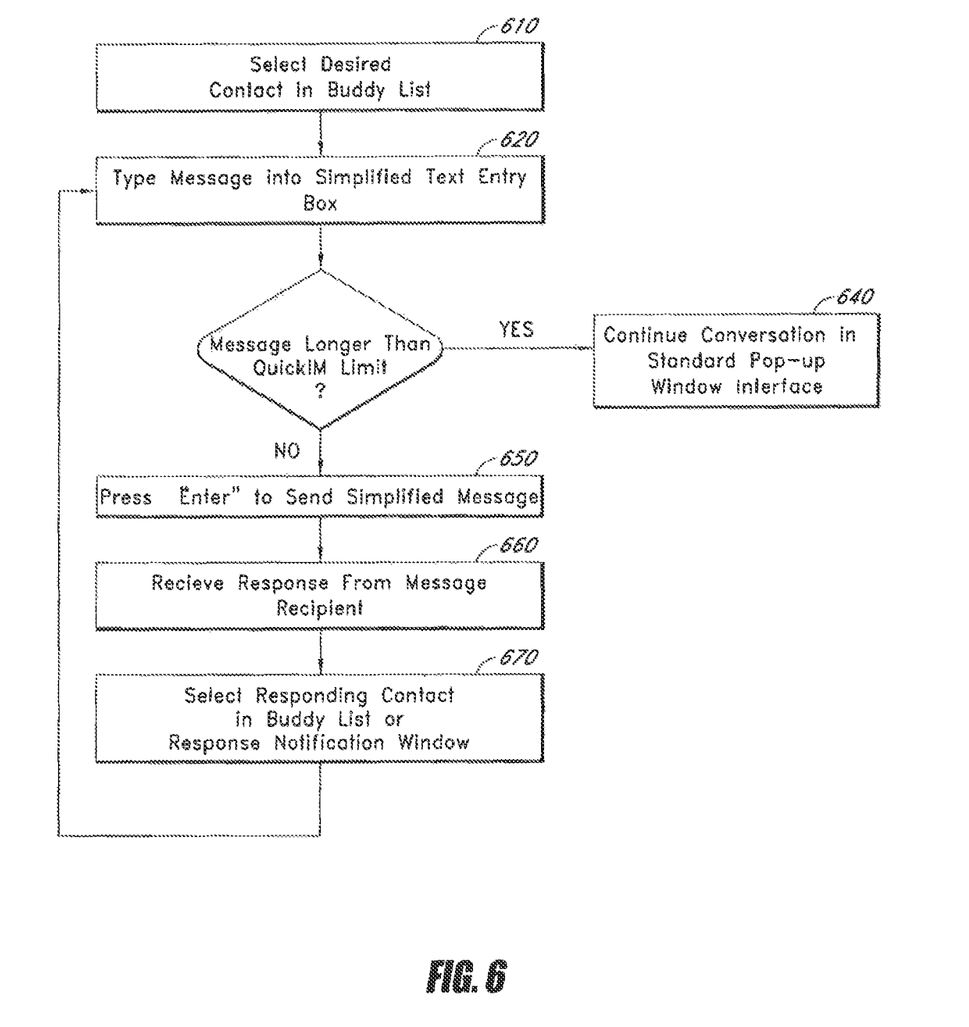
FIG. 6 is one embodiment of a high-level flow chart illustrating one embodiment of a simplified IM interface, viewed from the perspective of the user.

FIG. 6 is a high-level flow chart illustrating one embodiment of a simplified IM interface, but viewed from the perspective of the sending user. The user will selects a desired message recipient from the messaging contact list at state 610 by, for example, hovering the cursor over, clicking on, or high-lighting the identifier associated with the contact in the contact list. The user will then type a message into the simplified message-entry field at state 620.

As indicated by decision state 630 and described above with respect to FIG. 5, in some embodiments, a standard messaging window interface will open at state 640 if the user types a message with more characters than a threshold message size associated with the simplified message-entry field. If the threshold message size is not reached, the user may then decide to send the message at state 650 by, for example, pressing the "Enter" key to indicate that they want to send the message. Typically, the conversation will continue by user waiting for and then receiving a response from the message recipient at state 660. The user may then want to reply to the response using the simplified IM interface by selecting the message recipient at state 670 in a manner similar to that of state 610. When replying to the recipient's response at state 670, the simplified message entry field may be integrated with the messaging contact list or, alternatively, in some embodiments, in other parts of the IM interface. For example, the message entry field may be integrated with the response notification window.

For simplicity, FIGS. 5 and 6 illustrate the general flow of a conversation by means of certain embodiments using the simplified IM interface. The steps may be ordered differently depending on the conversation. For example, in other conversations, the sending user may send two messages using the simplified IM interface before receiving a response from the desired message recipient, or may never in fact receive a response. Moreover, the simplified IM interface can, in some embodiments, be used in combination with the standard IM interface. For example, the user may decide to send the initial message using the simplified IM interface and respond to the reply from the message recipient using the standard IM interface or vice versa. Alternatively, for example, the user could decide to hold the entire conversation in the simplified IM interface. For the sake of simplicity, FIGS. 5 and 6 illustrate embodiments of conversations using the simplified IM interface from the perspective of the sending IM client and sending user. However, the simplified IM interface may be used by the responding IM client and responding user as well.

VI. Additional Embodiments

Although systems and methods are disclosed with reference to preferred embodiments, the invention is not intended to be limited thereby. Rather, a skilled artisan will recognize from the disclosure herein a wide number of alternatives for providing a simplified IM interface.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

The network 140 may include one or more of any type of electronically connected group of devices including, for instance, the following networks: a virtual private network, a public Internet, a private Internet, a secure Internet, a private network, a public network, a value-added network, a local area network (LAN), a wide area network (WAN), a wired network, a wireless network, an intranet, an extranet, the Internet, a telephone network, a cable television network, voice over IP (VOIP), data, voice and video over IP (DV-VOIP), and/or any other type of network or combination of networks. In one embodiment, the network 140 may be capable of providing video, audio, and/or data communications. In addition, the connectivity to the network 140 may be, for example, remote modem, Ethernet (IEEE 802.3), Token Ring (IEEE 802.5), Fiber Distributed Datalink Interface (FDDI) or Asynchronous Transfer Mode (ATM).

In various embodiments, the computing system 200 may include a conventional general purpose single-chip or multi-chip microprocessor such as a Pentium® processor, a Pentium® II processor, a Pentium® Pro processor, an xx86 processor, an 8051 processor, a MIPS® processor, a Power PC® processor, or an ALPHA® processor. In addition, the microprocessor may be any conventional special purpose microprocessor such as a digital signal processor. Furthermore, the computing system 200 may be used in connection with various operating systems such as: Microsoft® Windows® 3.X, Microsoft® Windows 95, Microsoft® Windows 98, Microsoft® Windows® NT, Microsoft® XP, Microsoft® Vista, Microsoft® Windows® CE, Palm Pilot OS, OS/2, Apple® MacOS®, Disk Operating System (DOS), UNIX, Linux®, VxWorks, or IBM® OS/2®, Sun OS, Solaris OS, IRIX OS operating systems, and so forth.

It is also recognized that the term "remote" may include data, objects, devices, components, and/or modules not stored locally, that is not accessible via the local bus. Thus, remote data may include a device which is physically stored in the same room and connected to the user's device via a network. In other situations, a remote device may also be located in a separate geographic area, such as, for example, in a different location, country, and so forth.

Although the foregoing invention has been described in terms of certain preferred embodiments, other embodiments will be apparent to those of ordinary skill in the art from the disclosure herein. Moreover, the described embodiments have been presented by way of example only, and are not intended to limit the scope of the inventions. Indeed, the novel methods and systems described herein may be embodied in a variety of other forms without departing from the spirit thereof. Accordingly, other combinations, omissions, substitutions and modifications will be apparent to the skilled artisan in view of the disclosure herein.

What is claimed is:

1. A method of providing an electronic messaging interface, the method comprising the following operations performed by one or more processors:
   providing instructions to display a contact list in a graphical user interface, the contact list including a separate graphical region within the contact list for each contact in the list;
   receiving a selection of a contact in the contact list;
   providing instructions to display a message-entry field in the separate graphical region for the selected contact;
   receiving a message into the message-entry field in the separate graphical region for the selected contact; and
   sending the message to the selected contact.

2. The method of claim 1, further comprising:
   receiving a response message from the selected contact;
   providing instructions to display a response notification window, the response notification window including an additional message-entry field for receiving one or more additional messages.

3. The method of claim 1, further comprising initiating a standard messaging window after a threshold message size is received into the message-entry field.

4. The method of claim 3, wherein the threshold message size is significantly less than the amount displayed in a standard messaging window.

5. The method of claim 3, wherein the threshold message size is 20 characters.

6. The method of claim 3, wherein the threshold message size is 100 characters.

7. The method of claim 3, wherein the threshold message size is based on the type of language is used to compose the message.

8. The method of claim 1, further comprising automatically opening the message-entry field after a response is received from a contact.

9. The method of claim 1, wherein the selection is a first selection, the contact is a first contact, the message-entry field is a first message-entry field, and the message is a first message; and
wherein the method further comprises:
receiving a second selection of a second contact;
providing instructions to display a second message-entry field in the separate graphical region for the second contact, the separate graphical region for the second contact differing from the separate graphical region for the first contact;
receiving a second message into the second message-entry field; and
sending the second message to the second contact.

10. A system for providing an electronic messaging interface, comprising:
a processing system comprising one or more processors; and
a memory system that stores instructions, the instructions being executable by the processing system to perform operations comprising:
providing instructions to display a contact list in a graphical user interface, the contact list including a separate graphical region within the contact list for each contact in the list;
receiving a selection of a contact in the contact list;
providing instructions to display a message-entry field in the separate graphical region for the selected contact;
receiving a message into the message-entry field in the separate graphical region for the selected contact; and
sending the message to the selected contact.

11. The system of claim 10, wherein the operations performed by the processing system further comprise:
receiving a response message from the selected contact;
providing instructions to display a response notification window, the response notification window including an additional message-entry field for receiving one or more additional messages.

12. The system of claim 10, wherein the operations performed by the processing system further comprise:
initiating a standard messaging window after a threshold message size is received into the message-entry field.

13. The system of claim 12, wherein the threshold message size is significantly less than the amount of message displayed in a standard messaging window.

14. The system of claim 12, wherein the threshold message size is 20 characters.

15. The system of claim 1, wherein the threshold message size is 100 characters.

16. The system of claim 12, wherein the threshold message size is based on the type of language used to compose the message.

17. The system of claim 10, wherein the operations performed by the processing system further comprise:
automatically opening the message-entry field after a response is received from a contact.

18. A computer-implemented method of providing a messaging interface, comprising:
display a contact list in a graphical user interface, the contact list including a separate graphical region within the contact list for each contact in the list;
receiving a selection of a contact in the contact list;
displaying a first message-entry field in the separate graphical region for the selected contact;
detecting that a message entered into the first message-entry field has exceeded a threshold message size;
displaying a separate window in response to detecting that the message has exceeded the threshold message size, wherein the separate window includes a second message-entry field containing the message that the user entered into the first message-entry field and provides functionality for receiving a message that exceeds the threshold message size;
receiving an indication to send the message in the second message-entry field to the selected contact; and
sending the message to the selected contact.

* * * * *